Figure 1:
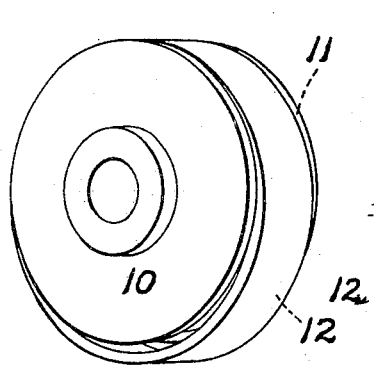

Feb. 3, 1931. J. D. RIGGS 1,791,379
BALANCED BELT DRIVE
Filed March 3, 1928

Inventor:
Jno. D. Riggs.

Patented Feb. 3, 1931

1,791,379

UNITED STATES PATENT OFFICE

JOHN D. RIGGS, OF INDIANAPOLIS, INDIANA

BALANCED BELT DRIVE

Application filed March 3, 1928. Serial No. 258,907.

My invention relates to improvements in means for transmitting power by belts and pulleys, and refers more particularly to an improved form of relieving roller sometimes used between a pair of "short center" pulleys to relieve the two shafts of the belt-pull, or between two sprocket wheels to counteract the pull of the chain. And the objects of my invention are; first, to provide the relieving roller with a much greater degree of elasticity than has formerly been available, and thereby to maintain a more uniform pressure between the roller and the slightly uneven pulleys; second, to secure a better tractive effect from the more uniform pressure, resulting in a considerable portion of the power being transmitted through the roller; third, to secure a durable wearing surface for the roller; and, fourth, to get a floating action of the relieving roller between the pulleys.

Other useful combinations employing elastic tractive rollers for transmitting power and for modifying speed may be described and claimed in a separate future application for patent.

Referring to the accompanying sheet of drawings, on which similar reference characters refer to corresponding parts throughout the several views—

Figure 2:
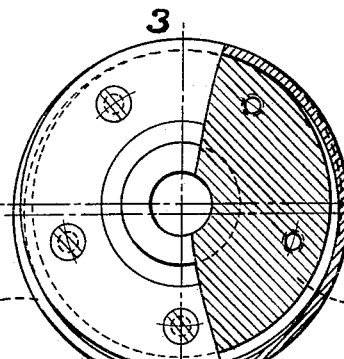
Figure 3:
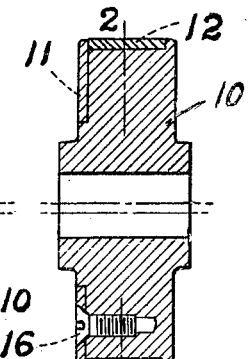
Figure 4:
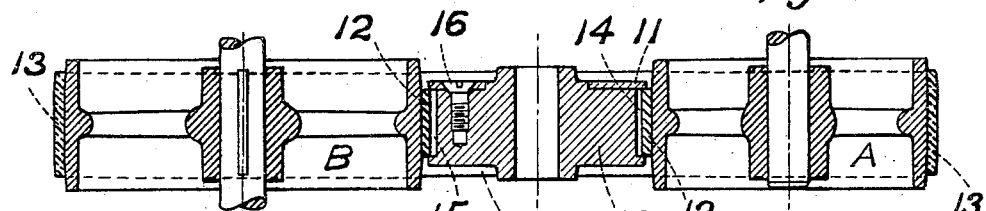
Figure 5:
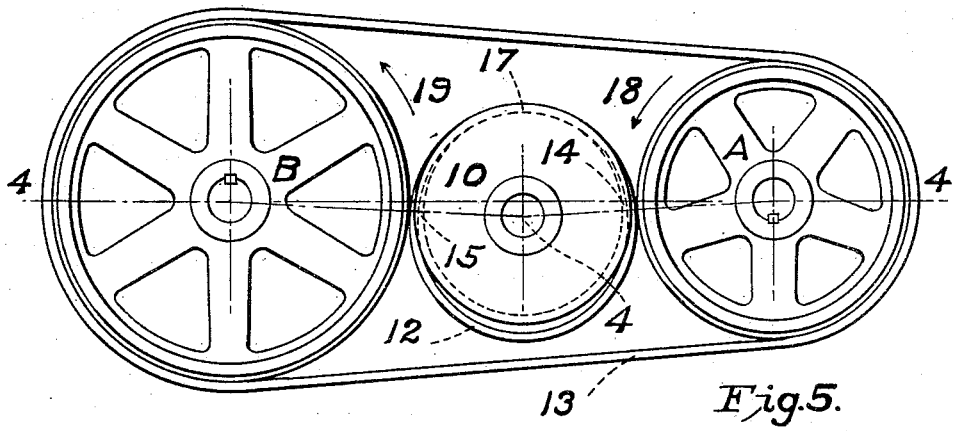
Figure 6:
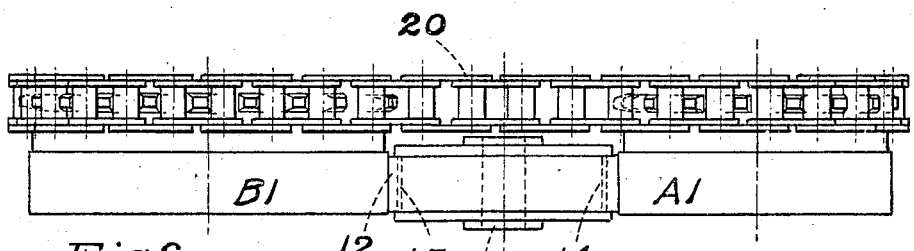

Figure 1, is a perspective view of my relieving roller, which consists of a central flanged roll and an outer spring-ring; Figure 2, is a side view of the same roller, partly in section at the central line 2 2 of Fig. 3, and showing the spring-ring in its relaxed round form; Figure 3, is a central sectional view of the same relieving roller, at the line 3 3 of Fig. 2; Figure 4, is a sectional plan view at the line 4 4 of Fig. 5, showing my relieving roller as assembled between a pair of pulleys which also carry a belt; Figure 5, is a side view of the assembled parts shown in Fig. 4, and illustrates the spring-ring in oval form as compressed under a working pressure; Figure 6, shows a plan view of an alternative combination, in which my relieving roller is used in connection with a pair of sprocket wheels and chain, and where it is necessarily placed slightly to one side of the sprocket teeth and chain.

When efforts have been made to apply a relieving roller in the form of a solid (one piece) cylinder it has been found that the ordinary pulleys do not run sufficiently true for satisfactory service; pulleys are not commonly made precisely round, and they are seldom mounted exactly true, so the slight yielding of a solid roll is not sufficient to overcome these irregularities. In introducing a floating spring-ring on a flanged roll these difficulties have been practically overcome.

My relieving roller consists of a central cast iron or mild steel roll, 10 (Figs. 2 and 3) provided with two flanges, one of which, 11, is made separable, and both flanges may be made separable and attached to the central portion with screws; on this central roll between the flanges is loosely mounted a somewhat larger spring-ring, 12, made of tempered spring steel, or other metal suitable for the construction of springs, and carefully ground; this spring-ring is made endless, weldless, round and concentric; it becomes oval only when subjected to working pressure, and takes an eccentric location on the central flanged roll when running and transmitting power. The width of this spring-ring is preferably about half the width of face of the pulleys with which it is to run; and the radial thickness of a nine-inch ring may be made so that the pull in the two strands of the belt will compress the ring about one-eighth inch, or, in other words, the long diameter may be one-quarter inch more than the short diameter for a nine inch ring under its working load. The spring-ring, 12, is made enough larger in diameter than the flanged roll, 10, so that there will be clearance space at the points 14 and 15, Figs. 4 and 5, while working. The ideal adjustment between the tension of the belt and compression of the relieving roller is to have them equal to each other, with no resulting stress on the two shafts, but considerable variation either way from an equal stress is quite permissible; in fact, either element will work and perform reasonably well without the other.

The relieving roller is free to rotate on its central supporting bearing, and may be mounted in the same way that idler pulleys are mounted. In Figures 4 and 5, the relieving roller is shown in position between the driving pulley A and the driven pulley B and the direction of rotation is indicated by the arrows 18 and 19. Under these conditions the relieving roller is adjustably mounted slightly below the line of centers, and may be adjusted up and down; in case the other pulley was driving and the rotation in the same direction, the relieving roller would preferably be placed slightly above the line of centers. In operation, the spring-ring, 12, makes contact at three points, one on the inside indicated by 17 (Fig. 5) and two on the outside where it comes in contact with the pulleys A and B, and I prefer to locate it slightly off-center so that the internal contact, 17, will be maintained when idling.

For tractive contact, about half of the face of each pulley is made "straight" and the remainder at each side is made crowning. Metal pulleys with steel rims are preferred, although almost any kind may be used.

Where a chain drive is used, it is evident that flanges A1 and B1, Fig. 6, must be at one side of the sprocket teeth, and the relieving roller placed slightly to one side. However, on large drives, flanges may be added on each side and two relieving rollers used. Diameters of the flanges may be the same as the pitch diameters of the sprocket wheels, or proportional to them. In some belt drives, where one or both pulleys are quite small, I prefer to locate the relieving roller to one side of the belt and to make it larger in diameter than there would be room for between the strands of the belt.

It is known that relieving rollers were used in connection with belt drives many years ago, and that comparatively rigid floating-rings have been used for other purposes for some years; and I do not claim such constructions broadly.

I claim:—

1. A tractive relieving roller, for the transmission of power, composed of a central roll provided with flanges on its periphery, and a spring-ring loosely mounted between said flanges, substantially as shown and for the purposes set forth.

2. The combination, in a power transmission, of an elastic tractive relieving roller composed of a central flanged roll and an outer loosely mounted spring-ring, a pair of pulleys adapted for tractive contact with said tractive relieving roller and for carrying a belt, a transmission belt on said pulleys, substantially as shown and described.

3. In a power transmission, the combination of a pair of "straight faced" pulleys adapted for tractive running contact, and an intermediate elastic metal roller composed of a central flanged roll and a somewhat larger spring-ring loosely mounted between the flanges and making contact with both pulleys, substantially as shown and for the purposes set forth.

4. In a power transmission, the combination of a pair of sprocket wheels provided with tractive flanges at the side, a drive chain, and an intermediate tractive counteracting roller composed of a central roll provided with flanges on its periphery and a spring-ring loosely mounted between said flanges, substantially as shown and described.

In testimony whereof I hereunto set my hand this second day of March, 1928.

JNO. D. RIGGS.